(12) United States Patent
Elizalde (10) Patent No.: US 9,003,982 B1
(45) Date of Patent: Apr. 14, 2015

(54) MOUND FORMING MACHINE AND SEED PLANTER SYSTEM

(71) Applicant: Ramiro Elizalde, Newman, CA (US)

(72) Inventor: Ramiro Elizalde, Newman, CA (US)

( * ) Notice: Subject to any disclaimer, the term of this patent is extended or adjusted under 35 U.S.C. 154(b) by 135 days.

(21) Appl. No.: 13/867,104

(22) Filed: Apr. 21, 2013

(51) Int. Cl.
*A01B 49/04* (2006.01)
*A01B 49/02* (2006.01)
*A01B 49/06* (2006.01)

(52) U.S. Cl.
CPC ............... *A01B 49/027* (2013.01); *A01B 49/06* (2013.01)

(58) Field of Classification Search
CPC .............................. A01B 49/027; A01B 49/06
USPC ......... 111/8, 9, 130–133, 11–14, 79, 81, 149, 111/157, 170, 154, 155
See application file for complete search history.

(56) References Cited

U.S. PATENT DOCUMENTS 1,452,625 A * 4/1923 Targosky ........................... 111/8

* cited by examiner

*Primary Examiner* — Christopher J Novosad
(74) *Attorney, Agent, or Firm* — QuickPatents; Kevin Prince (57) ABSTRACT

A horticulture apparatus for preparing and seeding a strip of farmland with a tractor includes a front frame fixed with the tractor and including a horizontal tine support bar for holding a plurality of downwardly-projecting tines. The front frame includes a middle frame pivot mount and pivot angle adjustment mechanism. A middle frame is fixed with the middle frame pivot mount and is adapted to be raised or lowered. A longitudinal support bar is fixed with a drill planter roller assembly that includes two drill planter roller frames each supporting at least one adjustable drill planter roller. A U-shaped back frame has two forward arms each pivotally fixed with the middle frame and including a rear drill planter roller. A seed distributing mechanism for fixing with the tractor includes a hopper having an open top end and a bottom end that includes a seed distribution opening and a seed spreader.

10 Claims, 9 Drawing Sheets

MOUND FORMING MACHINE AND SEED PLANTER SYSTEM

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to farm equipment, and more particularly to a multi-use tractor attachment.

DISCUSSION OF RELATED ART

When seeding a strip of farmland, prior art methods include the use of three or more separate machines: a seeding machine, a rototiller or spike apparatus, and a manicuring tractor. For example, traditionally when planting a crop such as alfalfa, the strip of farmland must first be loosened. Second, the seeds must be distributed on the loosened soil, and then the soil must be mixed with the seeds. Finally the strip of farmland must be packed down and manicured.

Therefore, there is a need for a device that can provide for all such seeding functions with a single tractor. Such a needed apparatus would allow for both the seeding, mixing and manicuring of the strip of farmland in one or at most two passes of the tractor over the strip of farmland. Such a needed invention would be relatively inexpensive when compared to utilizing separate vehicles, would require less storage space, and would be easily attached and detached from a conventional tractor. The present invention accomplishes these objectives.

SUMMARY OF THE INVENTION

The present device is a horticulture apparatus for preparing and seeding a strip of farmland with a tractor having a rear end and a front end. The strip of farmland may be flat or may have been previously formed into berms so that water may collected between the berms.

The horticulture apparatus includes a tractor attachment mechanism for selectively fixing the apparatus with the rear end of the tractor. A front frame is fixed with the tractor attachment mechanism and includes a horizontal tine support bar having a plurality of vertical mutually-aligned apertures therethrough each for holding a tine assembly that has at least one downwardly-projecting tine. The front frame further includes a middle frame pivot mount and a middle frame pivot angle adjustment mechanism.

A middle frame is fixed with the middle frame pivot mount at a forward pivot bar thereof that is fixed with a forward end of a longitudinal support bar that traverses the middle frame pivot angle adjustment mechanism and is adapted to be raised or lowered thereby. The longitudinal support bar is fixed with a drill planter roller assembly. The rearward end of the longitudinal support bar terminates in a back frame angle adjustment mechanism.

The drill planter roller assembly includes a horizontal roller support bar projecting laterally away from the longitudinal support bar of the middle frame at either side thereof, and a vertical central aperture. The horizontal roller support bar further includes a vertical lateral aperture therethrough. The horizontal roller support bar further includes a pair of lateral back frame pivot mounts and is fixed with a drill planter roller frame each supporting at least one adjustable drill planter roller.

A U-shaped back frame has two forward arms each pivotally fixed at one of the back frame pivot mounts of the horizontal roller support bar. The back frame terminates at a rear drill planter roller pivotally fixed thereto and further includes a central angle adjustment bar adapted for selective adjustable attachment with the back frame angle adjustment mechanism of the middle frame.

In a preferred embodiment, the apparatus further includes a seed distributing mechanism for fixing with the front end of the tractor that includes a hopper having an open top end and a bottom end that includes a seed distribution opening and a motorized seed spreader.

In use with the apparatus fixed with the rear end of the tractor and the tine assemblies and the drill planter roller frames each adjusted to engages the strip of farmland, and with the seed distribution mechanism fixed with the front end of the tractor and seeds inserted into the top end of the hopper, the tractor may be driven along the strip of farmland with the seeds being distributed along the strip of farmland ahead of the tractor, and with the plurality of tines breaking-up the farmland such that the seeds may be mixed therewith, and the drill planter rollers shaping and manicuring the strip of farmland and burring the seeds behind the tractor.

The present invention is an apparatus that can provide for all three seeding, mixing and manicuring functions with a single tractor. The present device allows for both the seeding, mixing and manicuring of the strip of farmland in one or at most two passes of the tractor over the strip of farmland. The present invention is relatively inexpensive when compared to utilizing separate vehicles for all three functions, requires less storage space, and is easily attached and detached from a conventional tractor. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
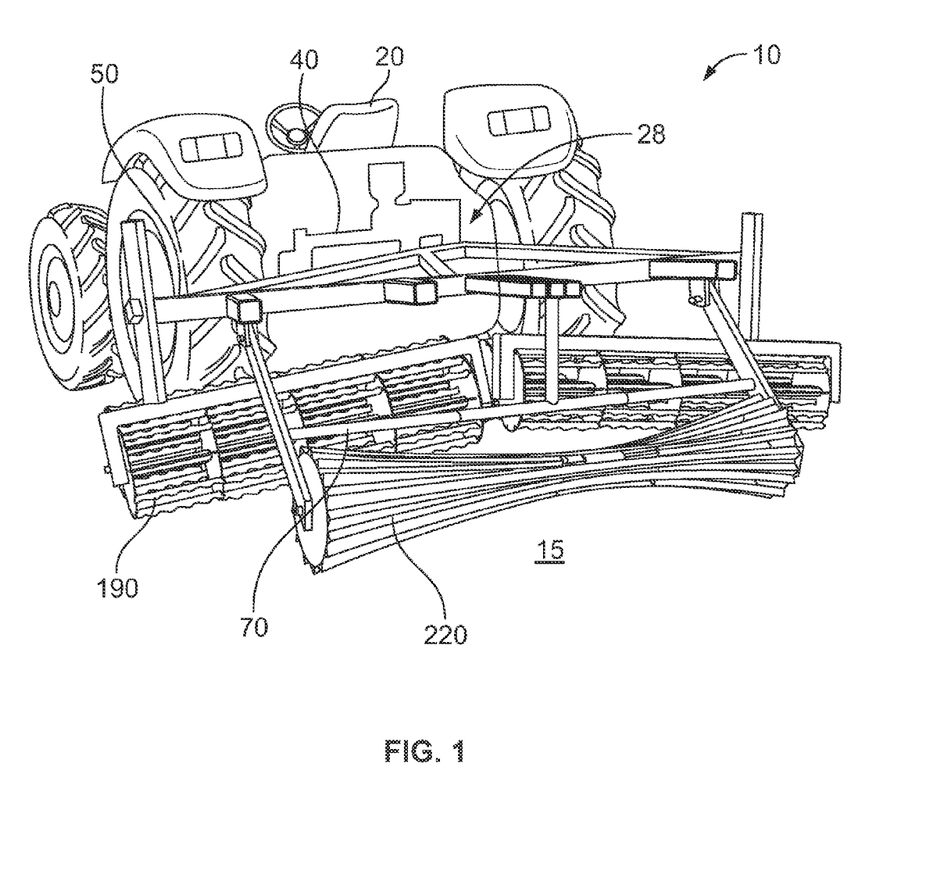
FIG. 1 is rear perspective view of the invention, as affixed to a rear of a tractor.
Figure 2:
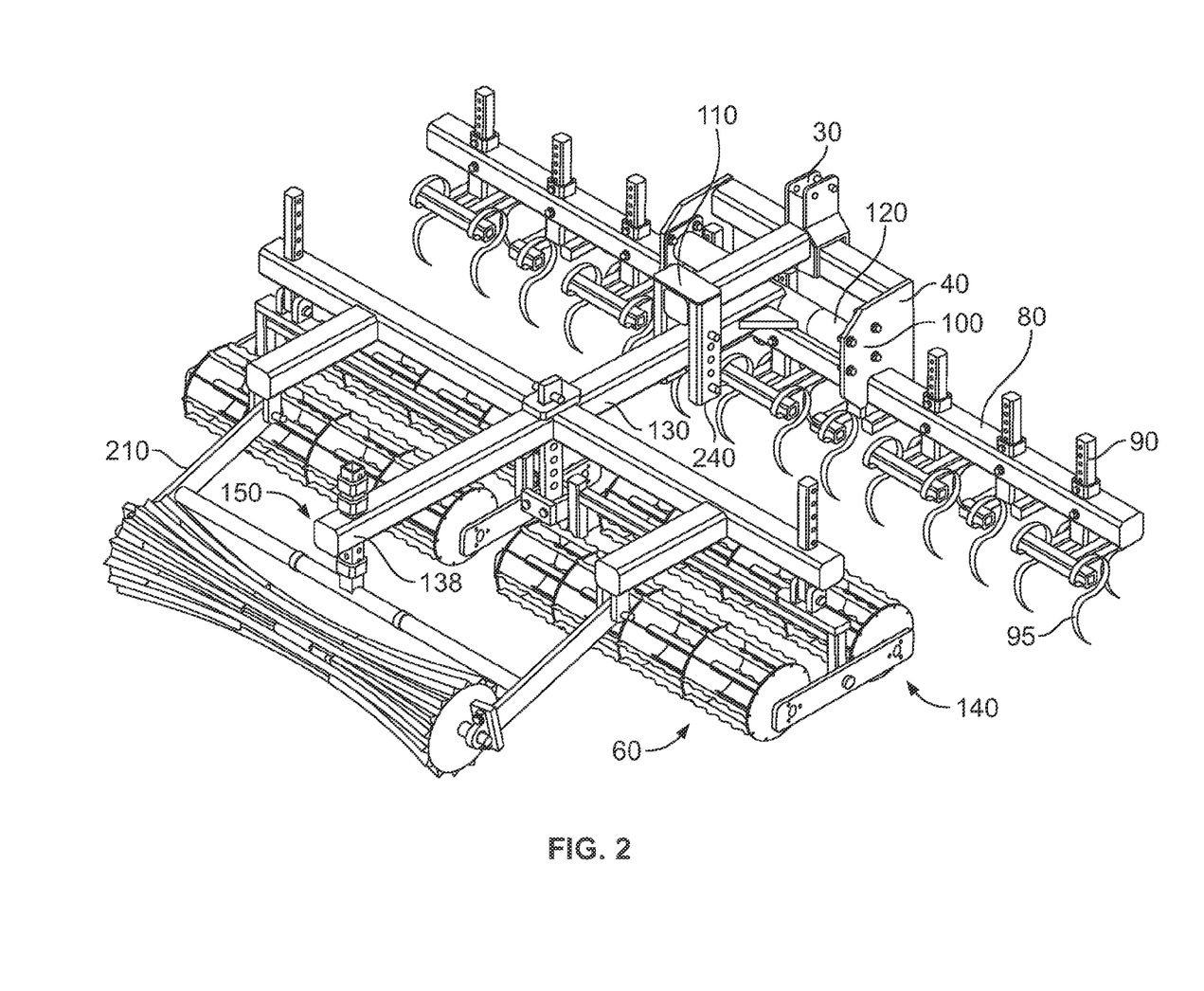
FIG. 2 is a top perspective view of the invention.
Figure 3:
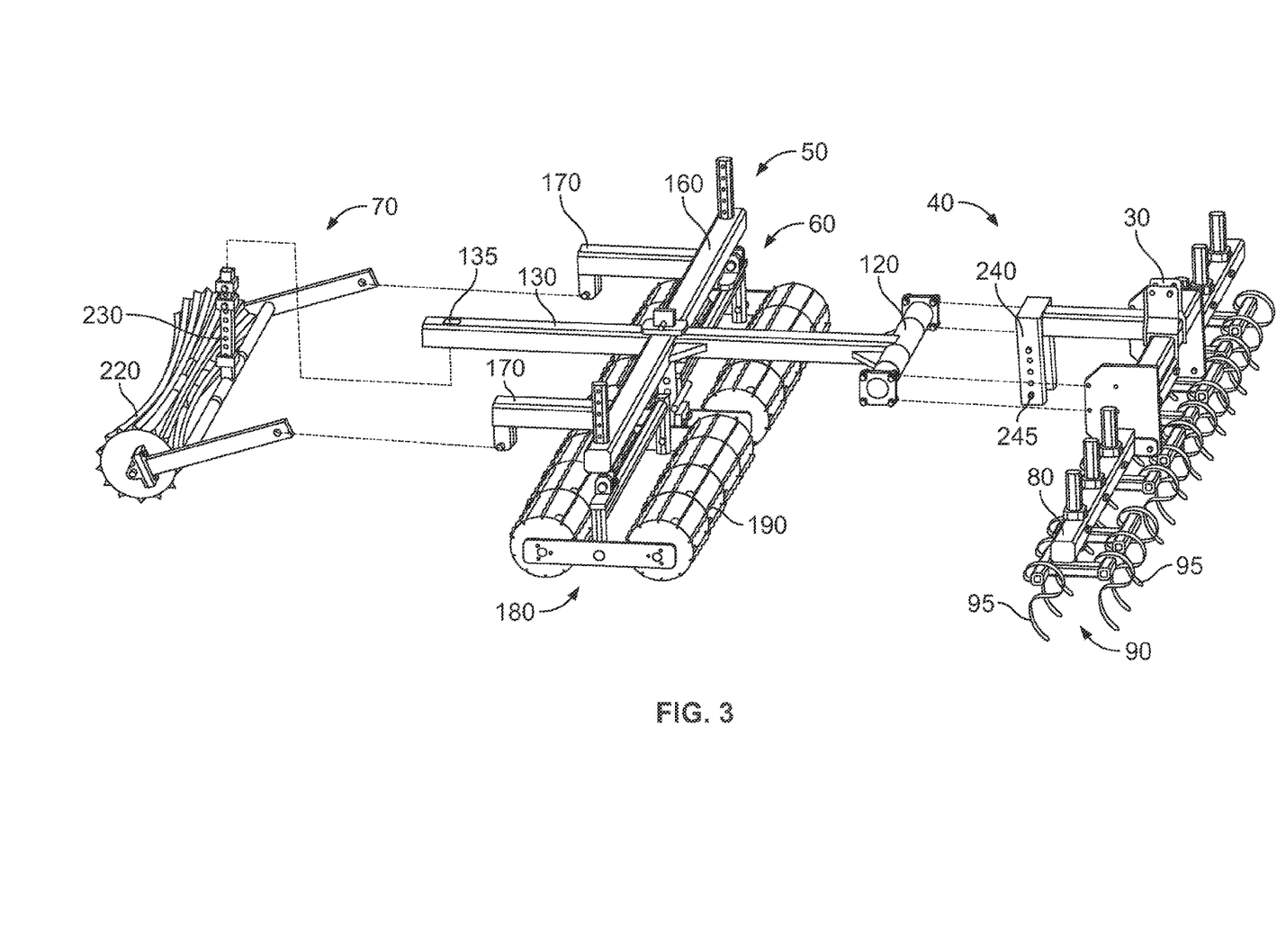
FIG. 3 is an exploded side perspective view of the invention.

FIGS. 1-3 illustrate a horticulture apparatus 10 for preparing and seeding a strip of farmland 15 with a tractor 20 having a rear end 28 and a front end 22. The strip of farmland 15 may be flat or may have been previously formed into berms so that water may collected between the berms.

Figure 4:
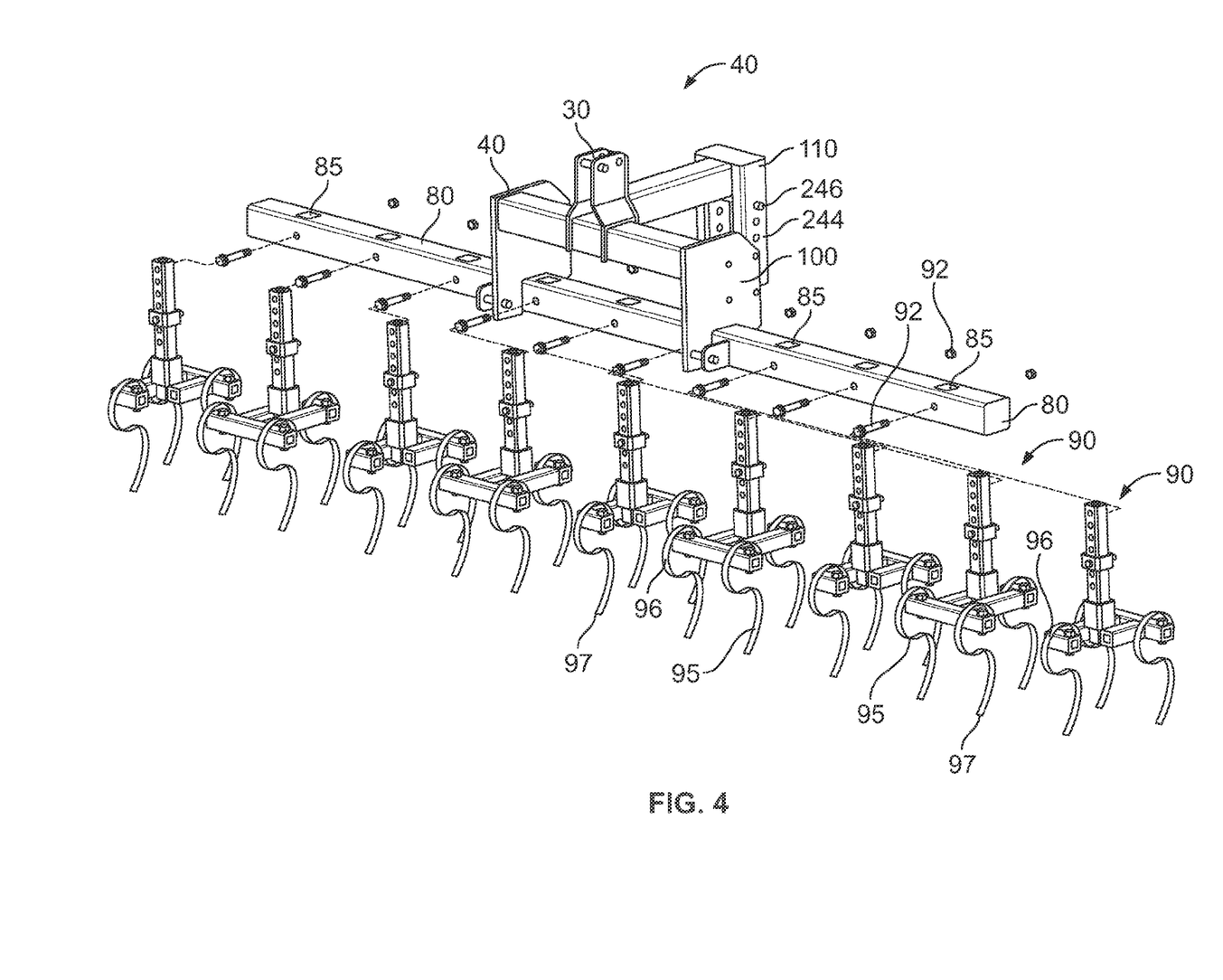
FIG. 4 is an exploded perspective view of a front frame of the invention.

The horticulture apparatus 10 includes a tractor attachment mechanism 30 for selectively fixing the apparatus with the rear end 28 of the tractor 20. A front frame 40 is fixed with the tractor attachment mechanism 30 and includes a horizontal tine support bar 80 having a plurality of vertical mutually-aligned apertures 85 therethrough (FIG. 4). The front frame 40 further includes a plurality of tine assemblies 90 that each have at least one downwardly-projecting tine 95 and each of which are adapted for selectively adjustable vertical positioning within one of the apertures 85 of the tine support bar 80, such as with a mechanical fastener 92. The front frame 40 further includes a middle frame pivot mount 100 and at a front end thereof a middle frame pivot angle adjustment mechanism 110. Each tine 95 may further include a curved spring section 96 and a relatively sharp ground-penetrating tip 97.

A middle frame 50 (FIGS. 5 and 6) is fixed with the middle frame pivot mount 100 of the front frame 40 at a forward pivot bar 120 thereof. The forward pivot bar 120 is fixed with a forward end 132 of a longitudinal support bar 130 that traverses the middle frame pivot angle adjustment mechanism 110 of the front frame 40 and is adapted to be raised or lowered thereby while pivoting about the pivot bar 120 thereof. The longitudinal support bar 130 is fixed with a drill planter roller assembly 140 between the middle frame pivot angle adjustment mechanism 110 and a rearward end 138 thereof. The rearward end 138 of the longitudinal support bar 130 terminates in a back frame angle adjustment mechanism 150.

Figure 5:
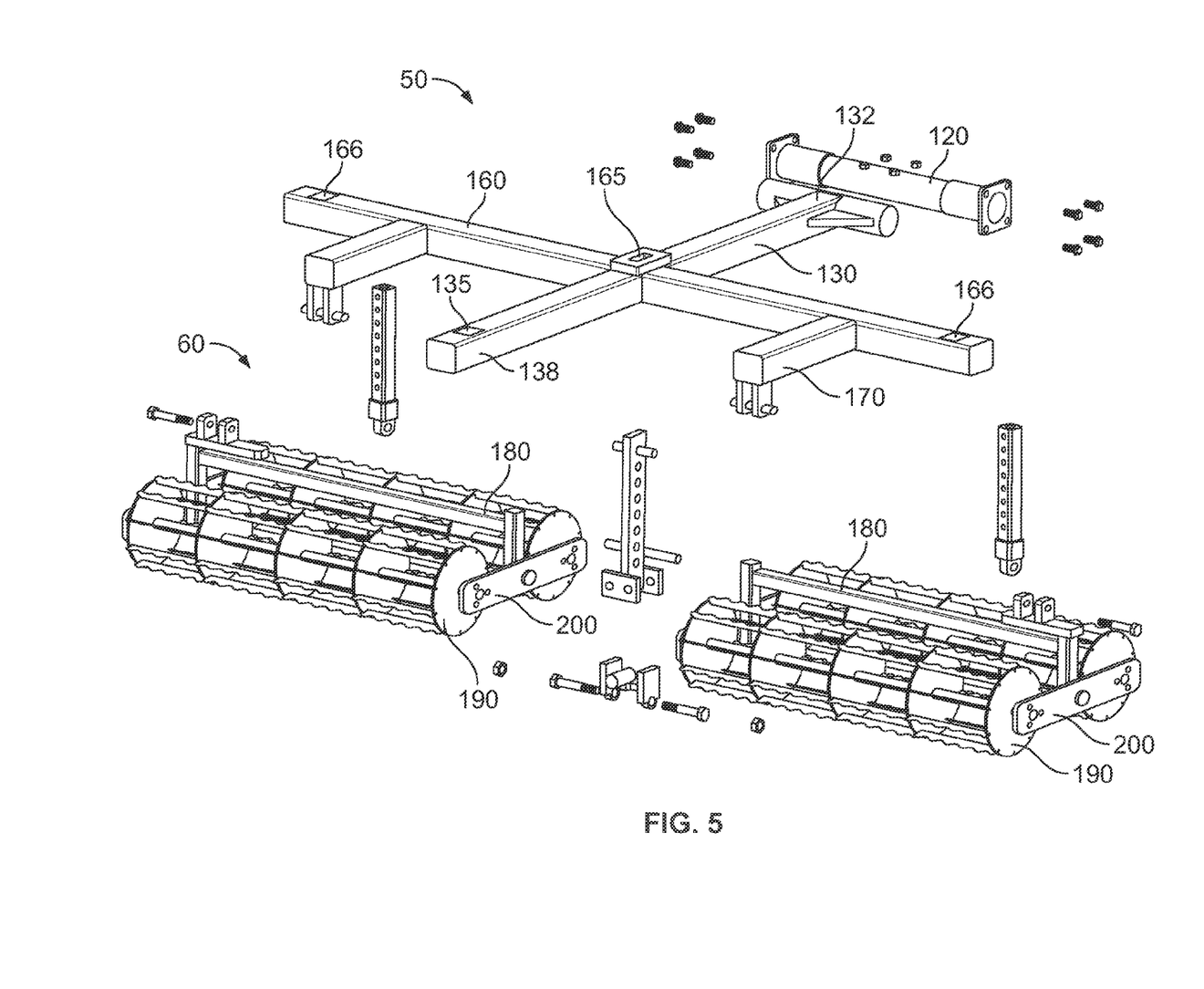
FIG. 5 is an exploded perspective view of a middle frame of the invention.

In one embodiment, the middle frame pivot mount 100 includes two opposing downwardly-projecting pin plates 240 each of which has a plurality of aligned pin apertures 245 through which a pin 246 may be selectively inserted to hold the longitudinal support bar 130 therebetween at a selected angle with respect to the front frame 40.

Figure 6:
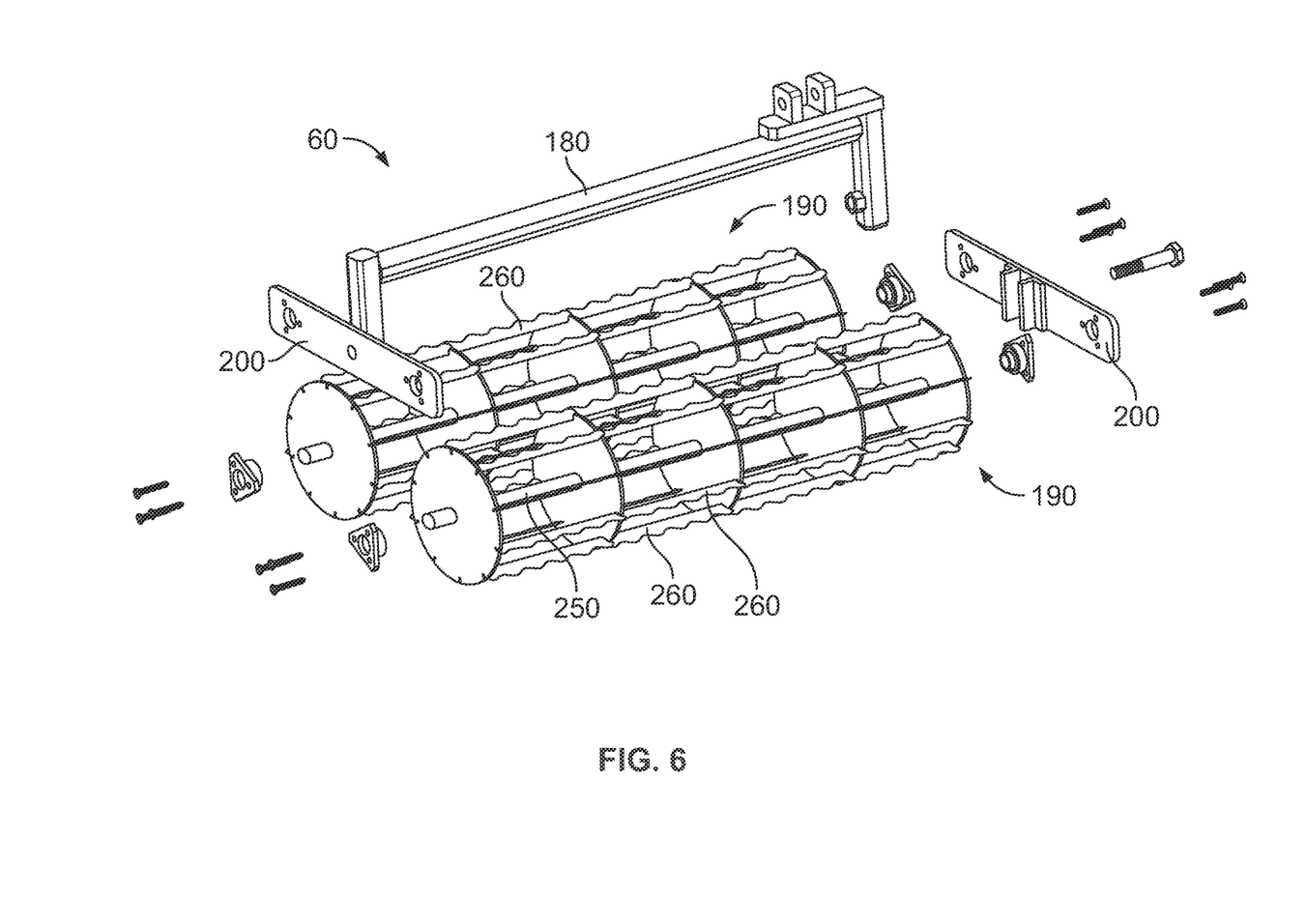
FIG. 6 is an exploded perspective view of a drill planter roller assembly of the invention.

The drill planter roller assembly 60 includes a horizontal roller support bar 160 projecting laterally away from the longitudinal support bar 130 of the middle frame 50 at either side thereof, and a vertical central aperture 165. The horizontal roller support bar 160 further includes a vertical lateral aperture 166 therethrough. The horizontal roller support bar 160 further includes a pair of lateral back frame pivot mounts 170 and is fixed with a drill planter roller frame 180 each supporting at least one drill planter roller 190, and preferably two such drill planter rollers 190, between two end assemblies 200. Each end assembly 200 is selectively adjustably fixed through one of either the central aperture 165 or one of the lateral apertures 166 so that the roll angle of each drill planter roller 190 with respect to the ground may be adjusted.

Figure 7:
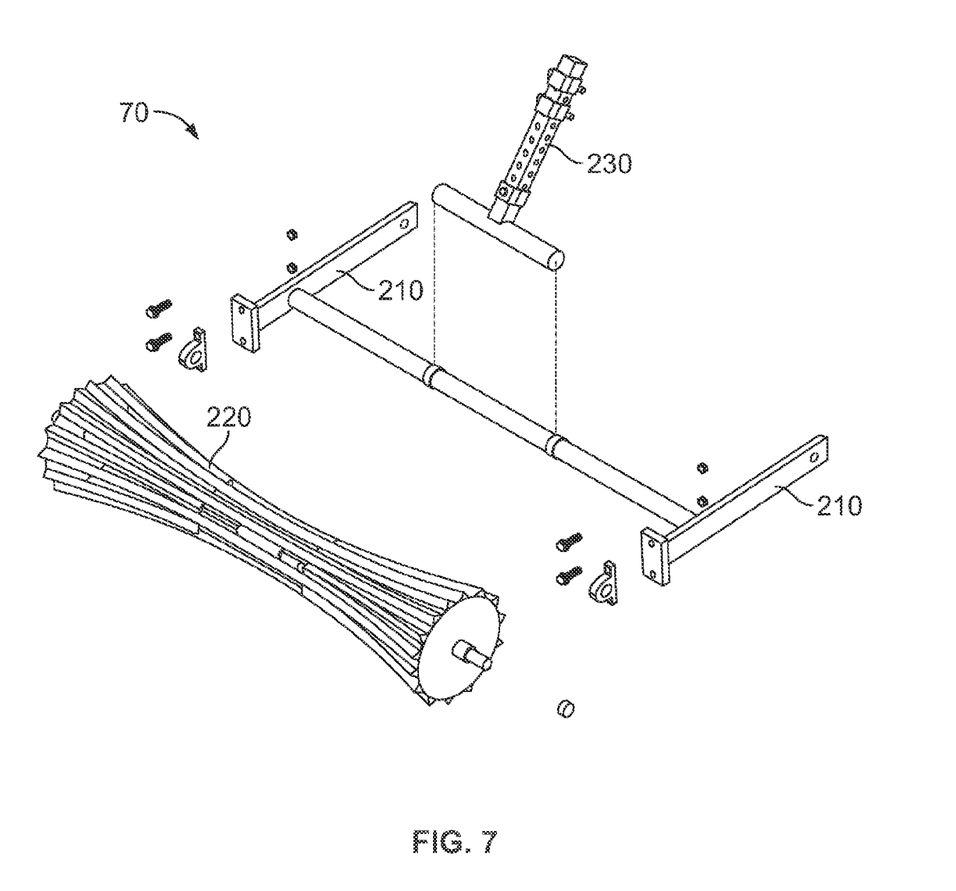
FIG. 7 is an exploded perspective view of a back frame of the invention.

A U-shaped back frame 70 has two forward arms 210 each pivotally fixed at one of the back frame pivot mounts 170 of the horizontal roller support bar 160. The back frame 70 terminates at a rear drill planter roller 220 pivotally fixed thereto and further includes a central angle adjustment bar 230 adapted for selective adjustable attachment with the back frame angle adjustment mechanism 150 of the middle frame 50. In one embodiment, the back frame angle adjustment mechanism 150 is an aperture 135 traversing vertically through the rearward end 138 of the longitudinal support bar 130 and is adapted to receive therethrough the angle adjustment bar 230 of the back frame 70. Each drill planter roller 190,220 preferably comprises a cylindrical roller frame 250 across which a plurality of drill planter bars 260 are fixed substantially in parallel to each other and the longitudinal rotational axis of the cylindrical roller frame 250.

Figure 8:
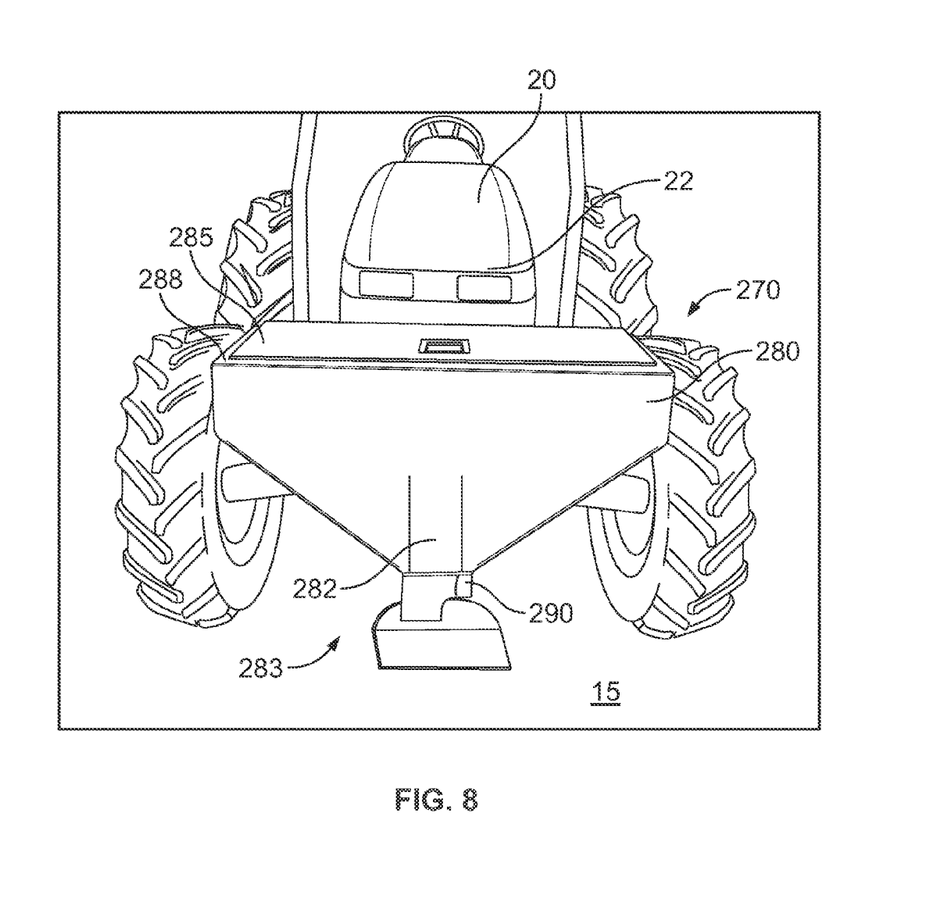
FIG. 8 is a front elevational view of an optional seed distributing mechanism of the invention, as affixed to the front of the tractor.
Figure 9:
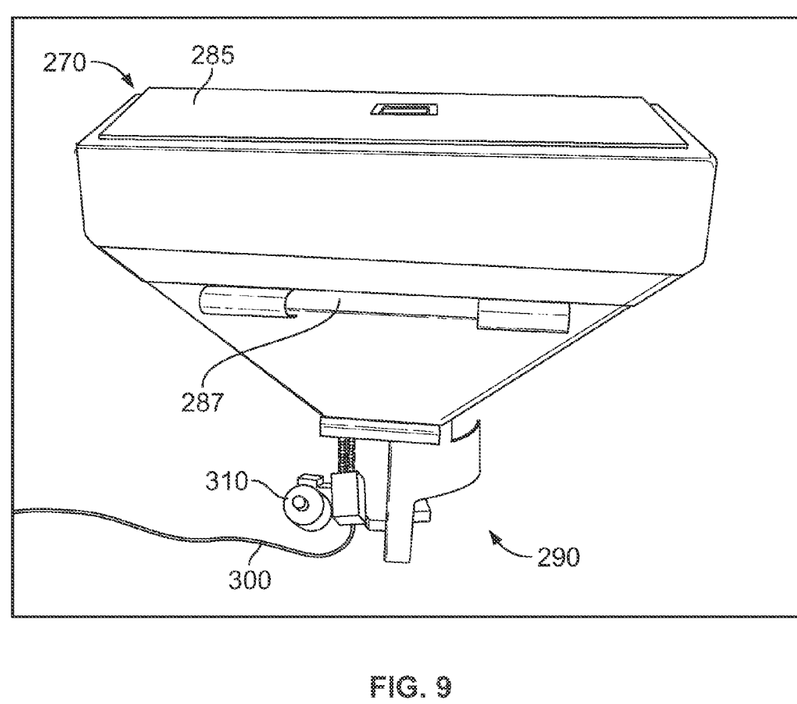
FIG. 9 is a rear perspective view of the seed distributing mechanism.

In a preferred embodiment, the apparatus 10 further includes a seed distributing mechanism 270 for fixing with the front end 22 of the tractor 20 that includes a hopper 280 having an open top end 288 and a bottom end 282 that includes a seed distribution opening 281. The bottom end 282 is sloped such that the seeds are directed toward the seed distribution opening 281 that includes a motorized seed spreader 290 adapted to receive the seeds from the hopper 280 and fling the seeds out of a forward end 283 thereof. The hopper 280 has a rearward end 287 adapted for fixing with the front end 22 of the tractor 20. The hopper 280 may preferably include a cover 285 for selectively sealing the open top end 288 of the hopper 280. The motorized seed spreader 290 preferably includes a power cable 300 electrically connected between a motor 310 thereof and a power source of the tractor 20. All of the elements of the apparatus 10, with the exception of motorized seed spreader power cable 300 and motor 310, are preferably made from a suitably strong rigid metallic material, such as steel or iron. The tines 95 may be resilient in their spring sections 96.

In use with the apparatus 10 fixed with the rear end 28 of the tractor 20 and the tine assemblies 90 and the drill planter roller frames 180 each adjusted to engages the strip of farmland 15, and with the seed distribution mechanism 270 fixed with the front end 22 of the tractor 20 and seeds inserted into the top end 288 of the hopper 280, the tractor 20 may be driven along the strip of farmland 15 with the seeds being distributed along the strip of farmland 15 ahead of the tractor 20, and with the plurality of tines 95 breaking-up the farmland 15 such that the seeds may be mixed therewith, and the drill planter rollers 190, 220 shaping and manicuring the strip of farmland 15 and burring the seeds behind the tractor 20.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A horticulture apparatus for preparing and seeding a strip of farmland with a tractor having a rear end and a front end, comprising:
   a tractor attachment mechanism for selectively fixing the apparatus with the rear end of the tractor;
   a front frame fixed with the tractor attachment mechanism and including a horizontal tine support bar having a plurality of vertical mutually-aligned apertures therethrough and a plurality of tine assemblies each having at least one downwardly-projecting tine and each adapted for selectively adjustable vertical positioning within one of the apertures of the tine support bar, the front frame further including a middle frame pivot mount and at a front end thereof a middle frame pivot angle adjustment mechanism;
   a middle frame fixed with the middle frame pivot mount of the front frame at a forward pivot bar thereof, the forward pivot bar fixed with a forward end of a longitudinal support bar that traverses the middle frame pivot angle adjustment mechanism of the front frame and is adapted to be raised or lowered thereby while pivoting about the pivot bar thereof, the longitudinal support bar being fixed with a drill planter roller assembly between the middle frame pivot angle adjustment mechanism and a rearward end thereof, the rearward end of the longitudinal support bar terminating in a back frame angle adjustment mechanism;
   the drill planter roller assembly comprising a horizontal roller support bar traversing the longitudinal support bar of the middle frame and including a vertical central aperture and vertical lateral apertures therethrough, the horizontal roller support bar including a pair of lateral back frame pivot mounts and fixed with a plurality of drill planter roller frames, each supporting at least one drill planter roller between two end assemblies, each end assembly selectively adjustably fixed through one of either the central aperture or one of the lateral apertures so that the roll angle of each drill planter roller is adjusted; and
   a U-shaped back frame having two forward arms each pivotally fixed at one of the back frame pivot mounts of the horizontal roller support bar, the back frame terminating at a rear drill planter roller pivotally fixed thereto and further including a central angle adjustment bar adapted for selective adjustable attachment with the back frame angle adjustment mechanism;
   whereby with the apparatus fixed with the rear end of the tractor and the tine assemblies and the drill planter roller frames each adjusted to engage the strip of farmland, the tractor can be driven along the strip of farmland with the plurality of tines breaking-up the farmland and the drill planter rollers shaping and manicuring the strip of farmland behind the tractor.

2. The horticulture apparatus of claim 1 wherein each tine assembly is fixed with the tine support bar with a mechanical fastener.

3. The horticulture apparatus of claim 1 wherein each tine includes a curved spring section and a relatively sharp ground penetrating tip.

4. The horticulture apparatus of claim 1 wherein the middle frame pivot mount of the front frame includes two opposing downward projecting pin plates each having a plurality of aligned pin apertures through which a pin is selectively inserted to hold the longitudinal support bar therebetween at a selected angle with respect to the front frame.

5. The horticulture apparatus of claim 1 wherein each drill planter roller frame includes a pair of the drill planter rollers fixed rotatably thereto, each drill planter roller being substantially mutually parallel.

6. The horticulture apparatus of claim 1 wherein the back frame angle adjustment mechanism is an aperture traversing vertically through the rearward end of the longitudinal support bar and adapted to receive therethrough the angle adjustment bar of the back frame.

7. The horticulture apparatus of claim 1 wherein each drill planter roller comprises a cylindrical roller frame across which a plurality of drill planter bars are fixed substantially in parallel to each other and the longitudinal rotational axis of the cylindrical roller frame.

8. The horticulture apparatus of claim 1 further including a seed distributing mechanism for fixing with the front end of the tractor, the seed distributing mechanism comprising:
   a hopper having an open top end and a bottom end having a seed distribution opening, the bottom end sloped such that the seeds are directed toward the seed distribution opening that includes a motorized seed spreader adapted to receive the seeds from the hopper and fling the seeds out of a forward end thereof, the hopper having a rearward end adapted for fixing with the front end of the tractor;

whereby with the front frame fixed with the rear end of the tractor and the tine assemblies and the drill planter roller frames each adjusted to engage the strip of farmland, and with the seed distribution mechanism fixed with the front end of the tractor and seeds inserted into the top end of the hopper, the tractor can be driven along the strip of farmland with the seeds being distributed along the strip of farmland ahead of the tractor, and the plurality of tines breaking-up the farmland such that the distributed seeds are mixed therewith, and the drill planter rollers shaping and manicuring the strip of farmland and burring the seeds behind the tractor.

9. The horticulture apparatus of claim 8 wherein the hopper includes a cover for selectively sealing the open top end of the hopper.

10. The horticulture apparatus of claim 8 wherein the motorized seed spreader includes a power cable electrically connected between a motor thereof and a power source of the tractor.

\* \* \* \* \*